US005519484A

United States Patent [19]

Kumagai

[11] Patent Number: 5,519,484

[45] Date of Patent: May 21, 1996

[54] METHOD AND APPARATUS FOR FORMING IMAGES ON BOTH SIDES OF A RECORDING PAPER WITHOUT REVERSING THE PAPER

[75] Inventor: Minoru Kumagai, Tokyo, Japan

[73] Assignee: NEC Corporation, Tokyo, Japan

[21] Appl. No.: 352,882

[22] Filed: Dec. 9, 1994

[30] Foreign Application Priority Data

Dec. 9, 1993 [JP] Japan .................................... 5-308918

[51] Int. Cl.[6] .......................... G03G 21/00; G03B 27/32; G03B 27/52

[52] U.S. Cl. .............................. 355/319; 355/23; 355/24; 355/271; 355/272

[58] Field of Search ................................ 355/23, 24, 319, 355/271, 272, 273, 274, 275, 277

[56] References Cited

U.S. PATENT DOCUMENTS

| | | | |
|---|---|---|---|
| 3,697,170 | 10/1972 | Bhagat et al. | 355/274 X |
| 3,697,171 | 10/1972 | Sullivan | 355/274 X |
| 4,688,925 | 8/1987 | Randall | 355/319 |
| 4,714,939 | 12/1987 | Ahern et al. | 355/24 X |
| 5,021,836 | 6/1991 | Sterren et al. | 355/272 X |
| 5,027,159 | 6/1991 | Oda et al. | 355/271 |
| 5,070,371 | 12/1991 | Randall | 355/272 |
| 5,070,372 | 12/1991 | Randall | 355/272 |
| 5,138,389 | 8/1992 | Randall | 355/272 |
| 5,204,716 | 4/1993 | Kasahara et al. | 355/274 X |
| 5,408,302 | 4/1995 | Manzer et al. | 355/271 X |
| 5,420,662 | 5/1995 | Gerstner | 355/271 X |

*Primary Examiner*—Matthew S. Smith
*Attorney, Agent, or Firm*—Foley & Lardner

[57] ABSTRACT

In forming a first image and a second image on both sides of a recording paper by using an electrophotographic process, the first image is generated on a photosensitive drum, and is transferred to an intermediate transfer belt which can transfer and hold a developer image. The photosensitive drum and the intermediate transfer belt is disposed across a plane where the recording paper is conveyed. Subsequently, the second image is generated on the photosensitive drum after a developer remaining thereon has been removed, and is transferred to one side of the recording paper. After the second image has been fixed on one side of the recording paper, the first image is transferred from the intermediate transfer belt to the other side of the recording paper and fixed.

11 Claims, 10 Drawing Sheets t: THICKNESS OF INTERMEDIATE TRANSFER BELT (mm)

METHOD AND APPARATUS FOR FORMING IMAGES ON BOTH SIDES OF A RECORDING PAPER WITHOUT REVERSING THE PAPER

BACKGROUND OF THE INVENTION

1. Field of the Invention

The present invention relates to an image forming system using an electrophotographic process, and more particularly to a method of forming images on both sides of a recording paper and an image forming apparatus having a double-side image forming function.

2. Description of the Prior Art

An electrophotographic printer or a copying machine having a double-side image forming function has been proposed from the viewpoints of resource-saving and paper-saving in an office. In Japanese Patent Laid-open Publication No. SHO 59-222860, a double-side image forming system is disclosed in which two image forming units are provided in a single printer and respective images are formed on both sides of a recording paper by the two image forming units. However, since the apparatus requires two image forming units, it becomes a large size, as is a conventional copying machine, and the cost also becomes higher. Then, in recent years, there has been extensively adopted a switchback method in which an image is formed on the obverse of a recording paper, the recording paper is then reversed by a switchback, and an image is formed on the reverse of the paper (Japanese Patent Laid-open Publication No. SHO 60-114876, Japanese Patent Laid-open Publication No. SHO 63-54060).

The switchback method, however, has a complicated paper conveying path and requires a considerably wide space for reversing a recording paper. Moreover, since the size of this necessary space is proportional to the size of the recording paper, a printer capable of handling a large paper is inevitably increased in size. Also, since, after formation of an image on the obverse of the recording paper, the paper is reversed and an image is formed on the reverse of the paper, the paper conveying path becomes longer and it is difficult to form an image at high speeds. Further, conveying a recording paper complicatedly becomes a cause of paper jamming and various countermeasures therefor are also needed.

An important object of the present invention is accordingly to provide a double-side image forming method which is capable of forming images on both sides of a recording paper without reversing the obverse and reverse thereof.

Another important object of the present invention is to provide an image forming apparatus capable of forming an image at high speeds without using a switchback.

Still another important object of the present invention is to provide an image forming apparatus which is a small size and capable of forming an image on one side and both sides of a recording paper.

SUMMARY OF THE INVENTION

In an image forming method according to the present invention, a first image is generated on a first image holding body by exposure and development processes and then the first image is once transferred to and held in a second image holding body by a transferring process. Successively, after a developer remaining on the first image holding body has been removed, a second image is likewise generated on the first image holding body. The second image is transferred to one side of a recording paper by a transferring process and fixed by a fixing process. Successively, the first image held in the second image holding body is transferred from the second image holding body to the other side of the recording paper and fixed.

An image forming apparatus according to the present invention comprises a conveying path for conveying a recording paper in one direction, a first image holding body provided in one side of a conveying plane of the conveying path and capable of generating and erasing at least a developer image repeatedly, and a second image holding body provided in the other side of the conveying plane and capable of transferring and holding the developer image generated in the first image holding body. The image forming apparatus further comprises a first transfer unit for transferring the developer image generated on the first image holding body to one side of the recording paper. The first transfer unit is provided in the other side of the conveying plane and movable to a position opposed to the first image holding body. Further, a first fixing unit is provided downstream of the first transfer unit and fixes the developer image formed on one side of the recording paper. The image forming apparatus further comprises a second transfer unit provided downstream of the first fixing unit for transferring the developer image held in the second image holding unit to the other side of the recording paper, and a second fixing unit for fixing the developer image transferred to the other side of the recording paper.

By transferring the first image from the first image holding body to the second image holding body and holding it on the second image holding body, the second image can be transferred to one side of the recording paper by the first image holding body and the first transfer unit, and successively the first image held on the second image holding body can be transferred on the other side of the same recording paper by the second image holding body and the second transfer unit. Accordingly, images can be formed on the obverse and reverse of a recording paper only by conveying the recording paper in one direction.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENT

An embodiment of the present invention will hereinafter be described in detail with reference to the accompanying drawings.

Figure 1:
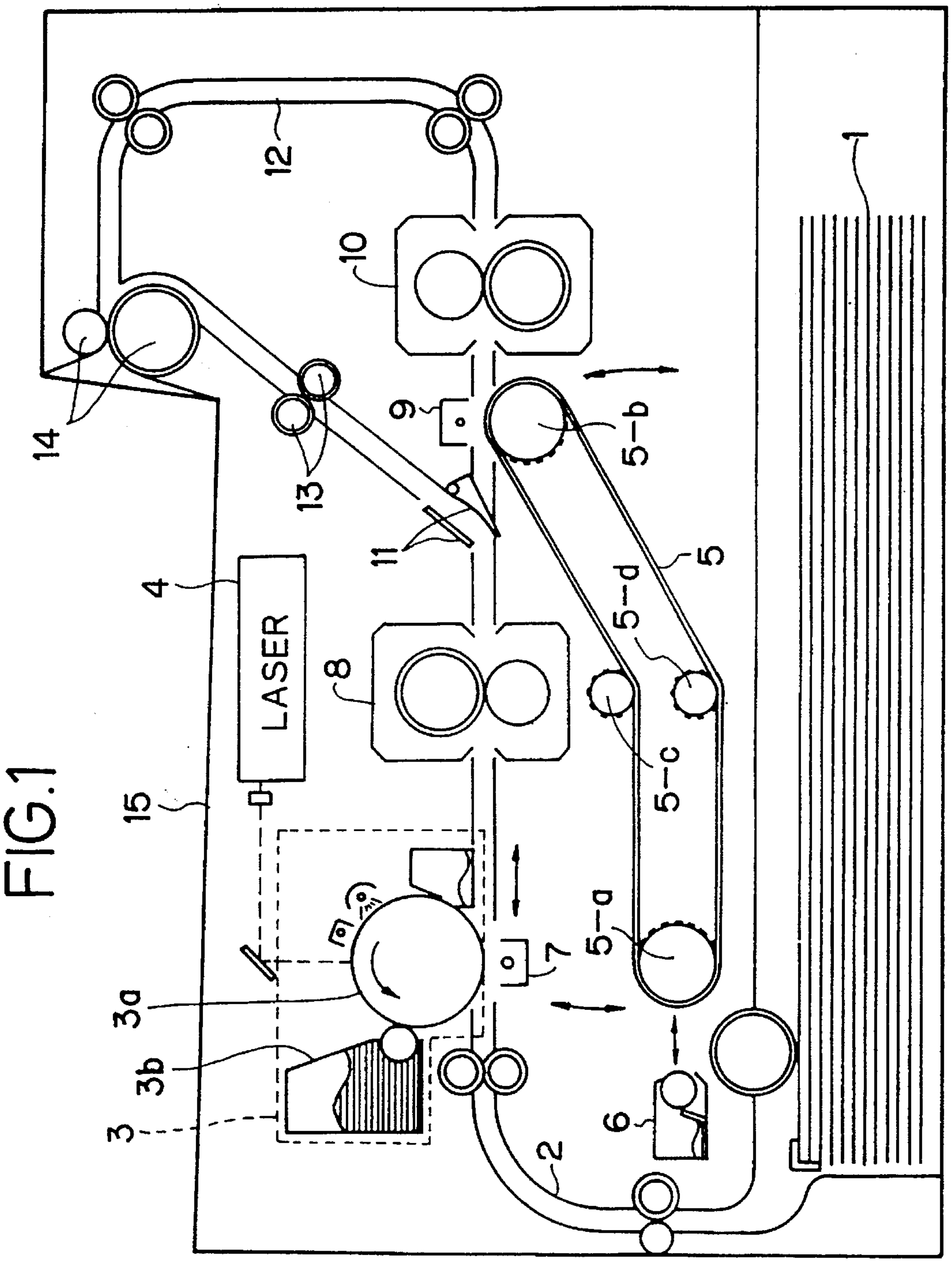
FIG. 1 is a vertical longitudinal sectional view of an electrophotographic printer constructed in accordance with an embodiment of the present invention.

Referring to FIG. 1, reference numeral 1 denotes a recording paper storage unit in which recording papers of a predetermined size are stored. The recording papers are sent to a conveying path 2 one by one by a paper feed roller. The recording paper sent to the conveying path 2 reaches an image forming unit 3, in which an image is transferred.

The image forming unit 3 comprises a photosensitive drum **3*a*, a development portion 3*b*, a cleaning portion, and a charging portion. An electrostatic latent image on the photosensitive drum 3*a* is formed by light emitted from a laser light source 4 which is driven according to image data, and developed by adhesion of the developer (toner) of the development portion 3*b*. Note that a first transfer unit 7 is incorporated into the drive mechanism of an intermediate transfer belt 5, as will be described later. When the first transfer unit 7 is opposed to the photosensitive drum 3*a*, the developer image on the surface of the photosensitive drum 3*a* is transferred to the recording paper. When, on the other hand, the intermediate transfer belt 5 is opposed to the photosensitive drum 3*a*, the developer image is transferred to the intermediate transfer belt 5**.

The developer image transferred to one side of the recording paper by the image forming unit 3 and the transfer unit 7 is fused and fixed on the recording paper by a first fixing unit 8. If image formation is performed on only one side of the recording paper, a conveying path will be changed by a conveying-path changing plate 11, and the recording paper will be discharged into a tray 15 by a discharge roller 14.

In the case of double-side image formation, the conveying-path changing plate 11 is raised upward and the recording paper that passed through the first fixing unit 8 is conveyed to a second transfer unit 9. The developer image on the intermediate transfer belt 5 is transferred to the other side of the recording paper by the second transfer unit 9 and fixed by a second fixing unit 10. The recording paper is then discharged through a conveying path 12 into the tray 15 by the discharge roller 14.

The intermediate transfer belt 5 is rotated by drive rollers 5-a and 5-b and support rollers 5-c and 5-d, and when the drive roller 5-a is opposed to the photosensitive drum **3*a*, the image on the photosensitive drum 3*a* is transferred to the intermediate transfer belt 5. This transferred image is in turn transferred to the recording paper by the second transfer unit 9. After the transfer to the recording paper, the developer remaining on the intermediate transfer belt 5 is removed by a cleaning unit 6**.

Intermediate Transfer Belt Drive Mechanism

Figure 2:
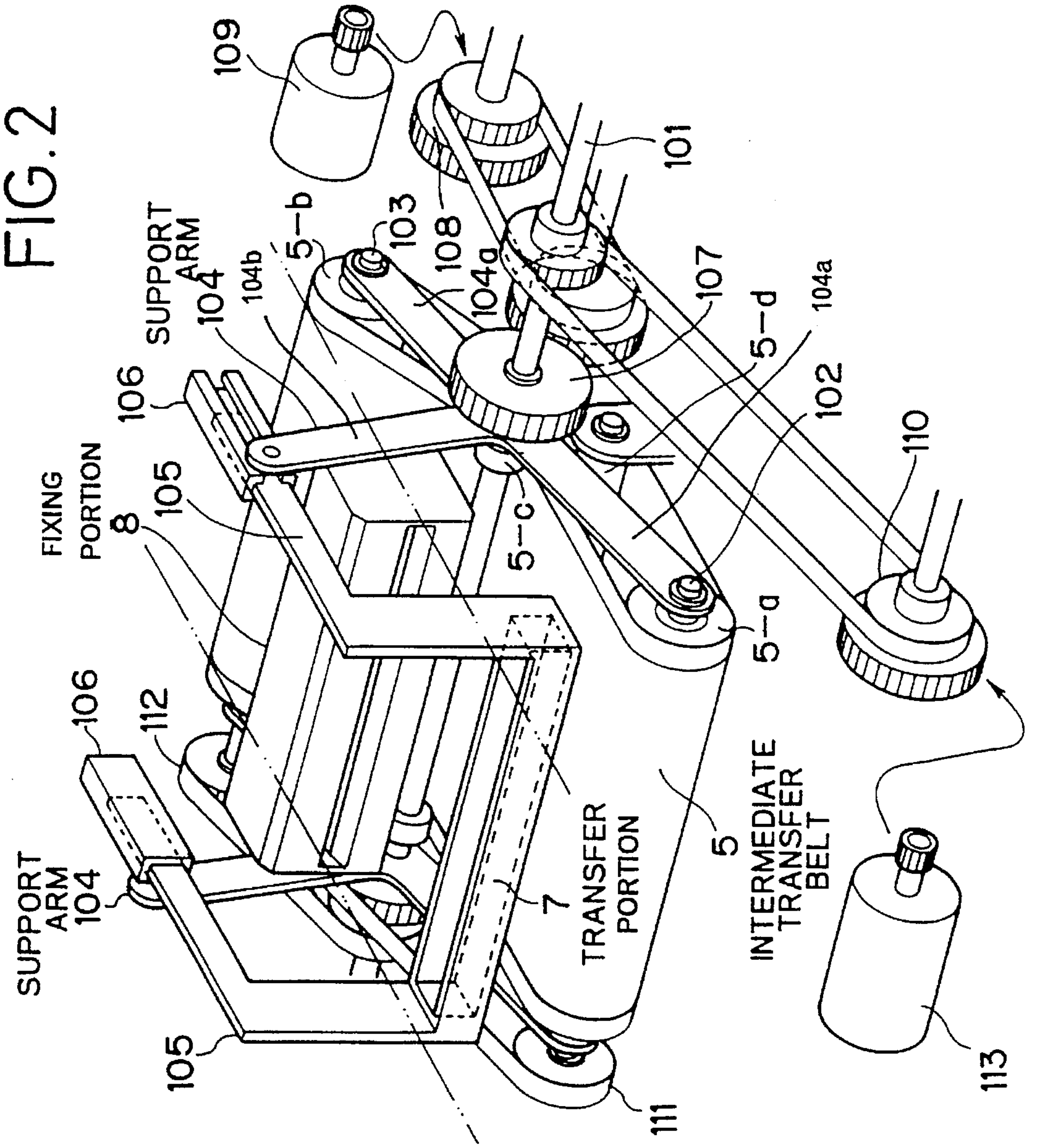
FIG. 2 is an enlarged perspective view showing the intermediate transfer belt drive mechanism of FIG. 1.
Figure 5:
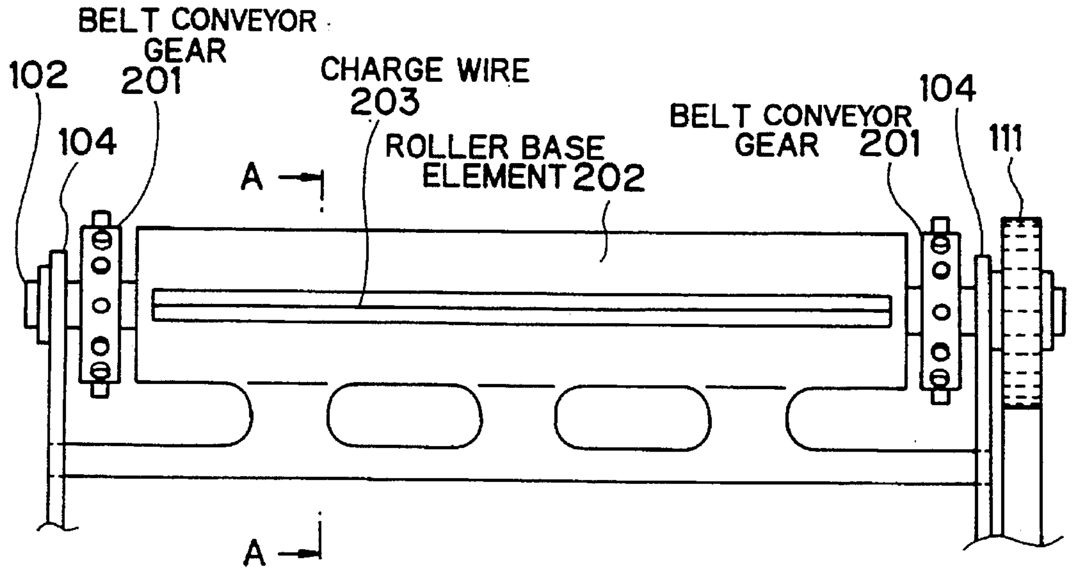
FIG. 5 is a plan view showing the drive roller of FIG. 2.
Figure 7:
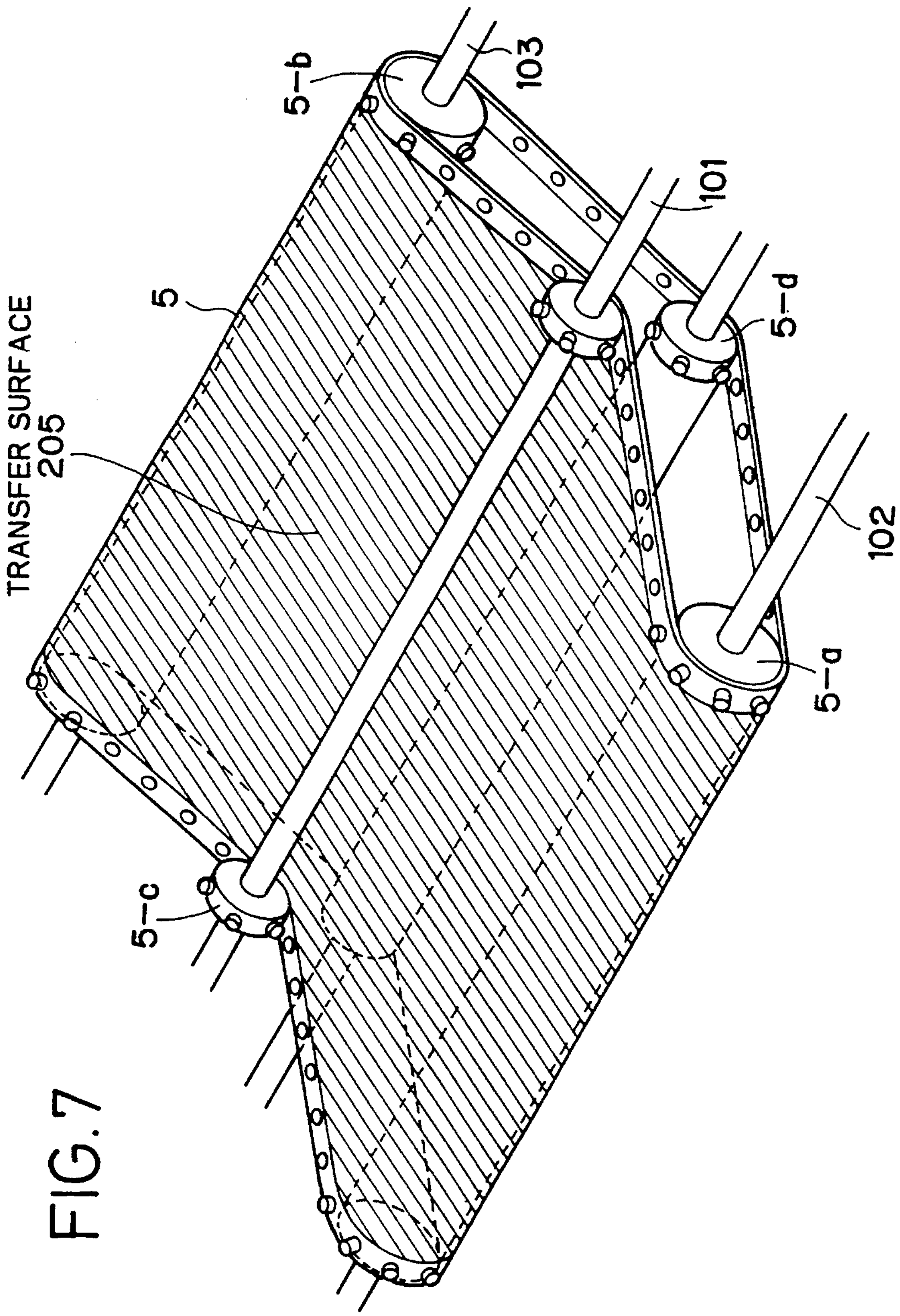
FIG. 7 is a perspective view of the intermediate transfer belt in FIG. 2.

The structure of the intermediate transfer belt drive mechanism in this embodiment will hereinafter be described in greater detail with reference to FIG. 2. In the figure, the drive rollers 5-a and 5-b for rotating the intermediate transfer belt 5 are supported on shafts 102 and 103, respectively, which are in turn supported by the horizontal arms **104*a* of support arms 104. The support roller 5-c, together with the support arms 104, is supported by a support shaft 101. The support roller 5-d is freely rotatably supported at a predetermined position of the printer main body. The support shaft 101 further supports a gear 107 coupled to the support arm 104, and belt gears 110,111, and 112 for rotating the intermediate transfer belt 5. Note that the drive rollers 5-a and 5-b are a cylindrical shape of the same diameter, and on the opposite outer peripheral portions of each of the rollers there are formed a plurality of pins for rotating the intermediate transfer belt 5 with reliability (details are shown in FIGS. 5 and 7**).

The support shaft 101 and the belt gears 110,111, and 112 are mechanically connected so that the rotation given to the belt gear 110 by a motor 113 can be transmitted through the support shaft 101 to the belt gears 111 and 112. On the other hand, since the support roller 5-c, the support arm 104, and the gear 107 are supported through bearings on the support shaft 101, they are rotated independently. More particularly, if a motor 109 rotates a belt gear 108, the gear 107 meshing with belt gear 108 will be rotated and therefore the support arm 104 will be rotated, as will be described later.

The horizontal arms **104*a* of the support arms 104 support the drive rollers 5-a and 5-b, while the vertical arms 104*b* are connected to slide arms 105 by which the first transfer unit 7 is carried. The slide arms 105 are horizontally slidably supported by guide rails 106 fixed to the printer main body. The slide arm 105 for horizontally sliding the first transfer unit 7 is provided with a cylindrical stud extending through an elongated bore (FIG. 3) formed in the vertical arm 104*b* of the support arm 104. By a combination of this coupling and the guide rail 106, the rotational motion of the support arm 104 is converted into the horizontal motion of the slide arm 105. Note that it is necessary to apply a lubricant to the coupled portions between the support arm 104 and the slide arm 105 and also to the sliding surfaces between the slide arm 105 and the guide rail 106** to alleviate the load caused by frictions.

The motor 109 is a source of power for rotating the support arms 104 and needs to be able to rotate in opposite directions. The motor 113 is a power source for rotating the intermediate transfer belt 5. Since the intermediate transfer belt 5 is rotated in one direction, the motor 113 may comprise a motor which rotates only in one direction. It is however necessary, from the necessity of controlling a rotational distance of the intermediate transferring belt 5, that rotation speeds and angles be easily controlled like a stepping motor.

Operation of Support Arm

Figure 3:
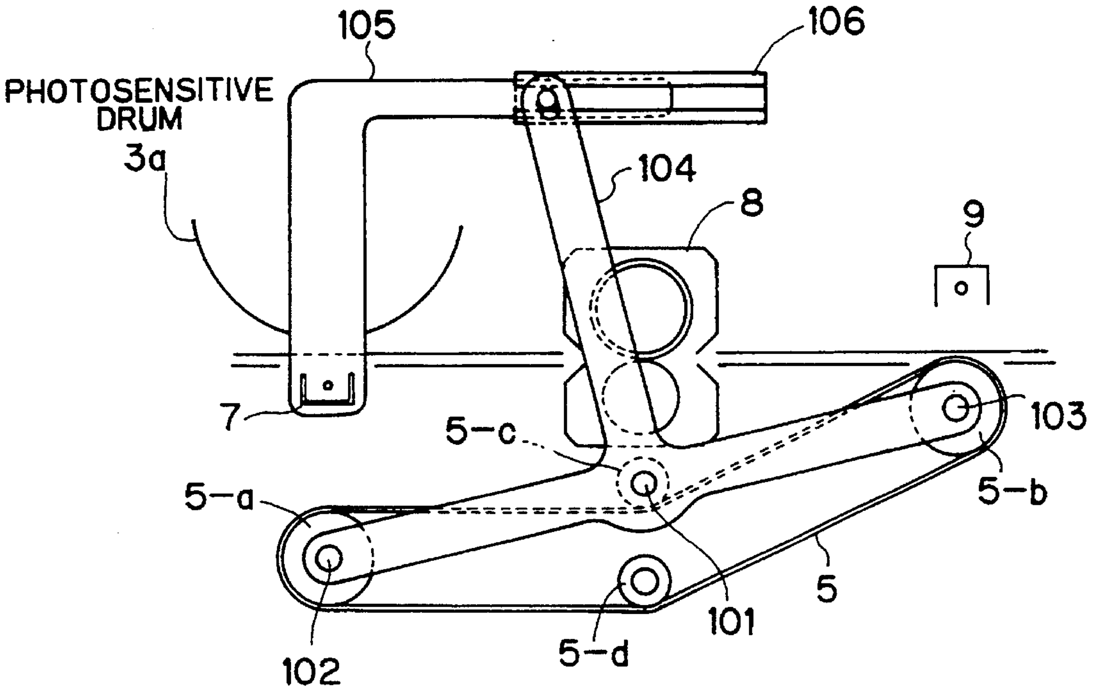
FIG. 3 is a side view showing the support arm of FIG. 2 held in a first state.
Figure 4:
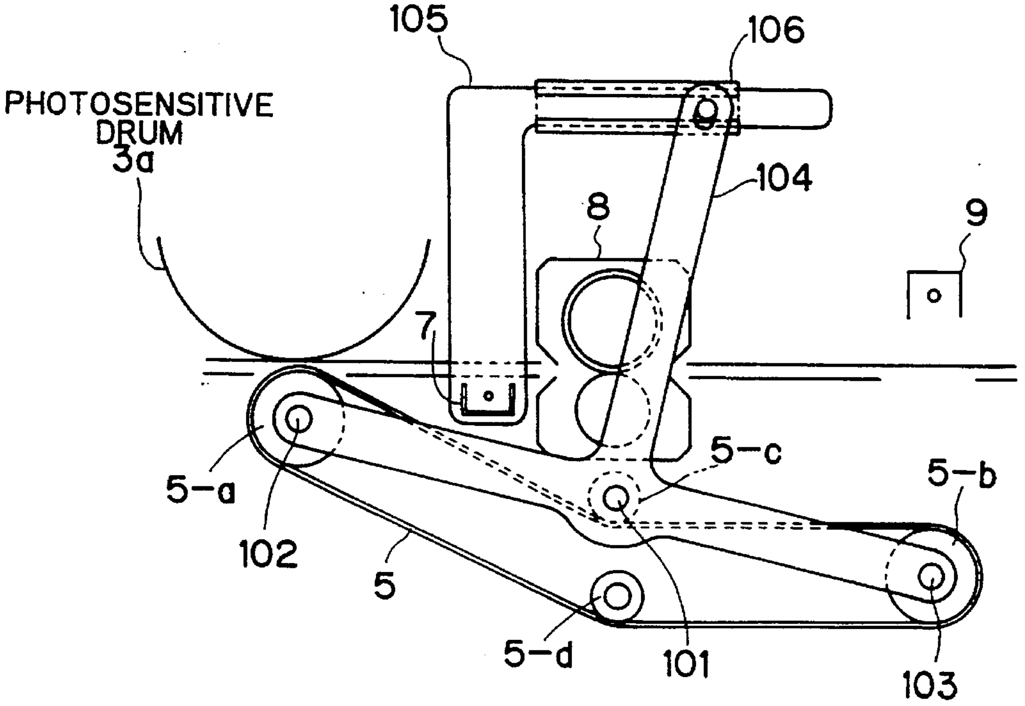
FIG. 4 is a side view showing the support arm of FIG. 2 held in a second state.

The operation of the support arms 104 will hereinafter be described with reference to FIGS. 3 and 4. As described above, the support arms 104 perform a rotational motion on the support shaft 101 according to the rotation of the motor 109. By this rotational motion, the upper and lower positions of the drive rollers 5-a and 5-b supported by the support arm 104 are changed, as shown in FIGS. 3 and 4. The positions of the support rollers 5-c and 5-d do not change.

If in FIG. 3 the support arm 104 is rotated counterclockwise by the motor 109, the drive roller 5-a will be moved downward of the photosensitive drum 3*a* and, instead, the slide arm 105 will be let out along the guide rail 106 and the first transfer unit 7 will be disposed just under the photosensitive drum 3*a*. On the other hand, the drive roller 5-b is moved upward and disposed just under the second transfer unit 9 for transferring an image to the reverse of a recording paper.

If in FIG. 4 the support arm 104 is rotated clockwise, the slide arm 105 will be retracted along the guide rail 106 and the first transfer unit 7 will be moved toward the first fixing unit 8. At the same time, the drive roller 5-a is raised upward and disposed just under the photosensitive drum 3*a* and, conversely, the drive roller 5-b is moved downward.

If the printer is in a normal one-side image formation mode, the support arm 104 will be held in the position shown in FIG. 3. If the printer is switched to a double-side image formation mode, the support arm 104 will be rotated clockwise, the drive roller 5-a will be disposed just under the photosensitive drum 3*a*, as shown in FIG. 4, and an image will be transferred from the photosensitive drum 3*a* to the intermediate transfer belt 5-a by transfer means provided in the drive roller 5-a. Successively, the support arm 104 is rotated counterclockwise so that the first transfer unit 7 is disposed just under the photosensitive drum 3*a* and at the same the drive roller 5-b is disposed just under the second transfer unit 9. In this state, another image is generated on the photosensitive drum 3*a*, the generated image is transferred from the photosensitive drum 3*a* to one side of the recording paper by the first transfer unit 7, and the transferred image is fixed by the first fixing unit 8. The recording paper is further conveyed and the image transferred to the intermediate transfer belt 5 is now transferred from the belt 5 to the other side of the recording paper by the second transfer unit 9. In this way, images can be formed on both sides of the recording paper, respectively.

Drive Roller 5-a

Figure 6:
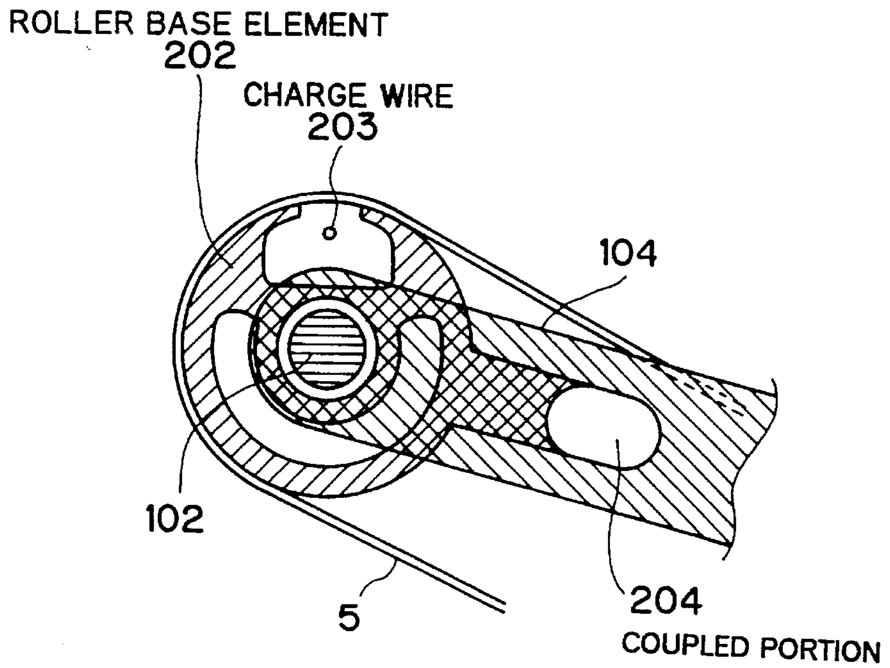
FIG. 6 is a cross sectional view of the drive roller in FIG. 5 taken substantially along line A—A of FIG. 5.

FIG. 5 is a plan view of the drive roller of the drive roller 5-a, and FIG. 6 is a cross sectional view of the drive roller 5-a taken substantially along line A—A of FIG. 5. The drive roller 5-a comprises belt conveyor gears 201 and 201 and a roller base 202 disposed between the belt conveyor gears 201 and 201. Since the belt conveyor gear 201 is coupled with the shaft 102 and the shaft 102 is coupled with the belt gear 111, rotation of the belt gear 111 is transmitted to the belt conveyor gear 201. The pins of the belt conveyor gears 201 mesh with pin bores provided in opposite side portions of the intermediate transfer belt 5 to rotate the belt 5 with reliability.

The roller base element 202 has a cylindrical shape and is coupled at a coupled portion 204 with the support arm 104 but it does not contact with the shaft 102. Therefore, the roller base element 202 is not affected by the rotation of the shaft 102 and is moved according to the rotation of the support arm 104.

Further, the roller base element 202 is provided with a longitudinally extending groove in which there is provided a charge wire 203 for transferring an image from the photosensitive drum 3*a* to the intermediate transfer belt 5. When an image is transferred from the photosensitive drum 3*a* to the intermediate transfer belt 5, corona discharge is generated by applying a high voltage to the charge wire 203 and, therefore, static electricity is induced on the surface of the intermediate transfer belt 5 to attract the developer image on the photosensitive drum 3*a*. Note that the drive roller 5-b is substantially identical with the drive roller 5-a except the charge wire 203.

Intermediate Transfer Belt 5

As shown in FIG. 7, the intermediate transfer belt 5 is wound around the rollers 5-a to 5-d with a transfer surface 205 disposed outside. The opposite side portions of the intermediate transfer belt 5 are provided with a plurality of pin bores arranged at predetermined intervals. These pin bores mesh with the pins of the belt conveyor gears of the rollers 5-a to 5-d so that the intermediate transfer belt 5 can be rotated accurately.

The horizontal and vertical scanning directions on the transfer surface 205 of the intermediate transfer belt 5 need to be designed to be longer than those of the maximum recording paper that the printer can handle. Particularly, for the horizontal scanning direction, the length of non-transfer section should be taken into consideration. To remove the remaining developer on the belt completely, it is necessary to contact the cleaning unit 6 with the surface of the intermediate transfer belt 5 ahead of the transfer starting position of the intermediate transfer belt 5, and at the same time this contact must not have an effect on the untransferred image on the intermediate transfer belt 5. Therefore, it becomes necessary to provide a non-transfer section of a suitable length in the scanning direction around the position at which the cleaning unit 6 first contacts with the belt surface. That is, it is preferable that the length of the intermediate transfer belt 5 be designed to the length of the non-transfer section added to the length of the transfer effective length.

Figure 8:
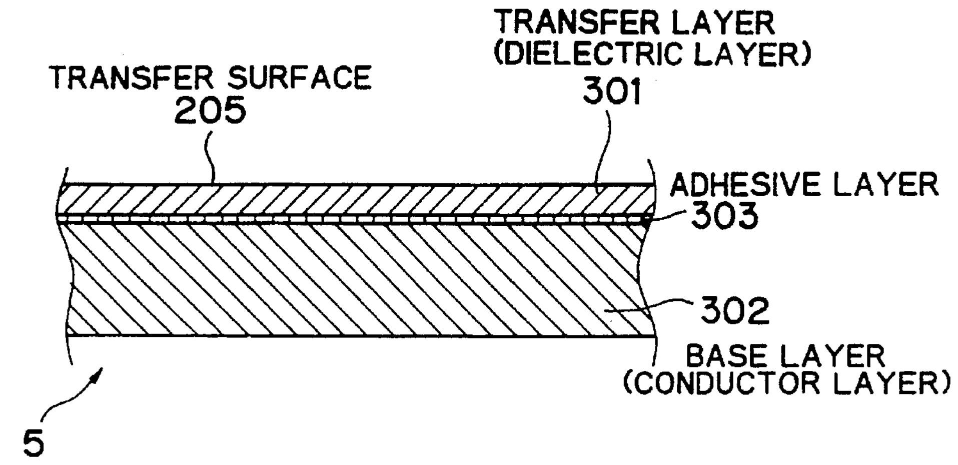
FIG. 8 is a cross sectional view of the intermediate transfer belt in FIG. 7.

FIG. 8 shows the layer structure of the intermediate transfer belt 5. The intermediate transfer belt 5 has a structure in which a transfer layer 301 and a base layer 302 are adhered by an adhesive layer 303. The transfer layer 301 is a layer for transferring a developer image formed on the photosensitive drum 3*a*, and the material is dielectric (insulator) such as polybutylene. In this embodiment, the transfer layer 301 plus the adhesive layer 303 is about 50 um in thickness. The base layer 302 comprises a flexible conductive material. In this embodiment there is used polystyrene of about 600 um thickness containing carbon black as a conductive filler. Note that the adhesive layer 303 may comprise any one of various materials which have no effect on the conductivity of the base layer 302. As described above, static electricity is induced on the transfer surface 205 of the intermediate transfer belt 5 by the corona discharge of the charge wire 203 of the drive roller 5-a, and the developer image on the photosensitive drum 3*a* is transferred to the transfer surface 205.

Figure 9:
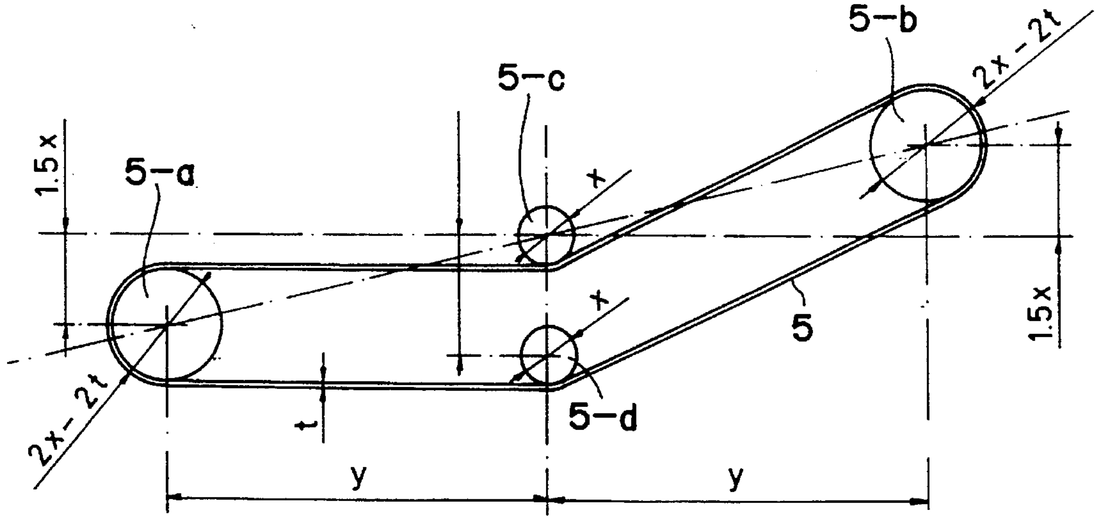
FIG. 9 is a cross sectional view showing an example of the layout of the drive rollers and the support rollers of this embodiment.

FIG. 9 shows an example of the layout of the drive rollers 5-a, 5-b supported on the support arm 104, the support roller 5-c, and the support roller 5-d supported on the printer main body. This embodiment is designed such that the center axes of the drive rollers 5-a, 5-b and the support rollers become in alignment with one another. This construction is effective in the design of the above-described drive mechanism of the support arm 104 and the intermediate transfer belt 5. Particularly, to establish the starting position of the developer transfer, there is important the selection of the diameter x of each of the support rollers 5-c and 5-d, the horizontal distance y from the support roller 5-c to the drive roller 5-a, the horizontal distance y from the support roller 5-d to the drive roller 5-b, and the accuracy of the drive motor 113. Note that the diameter of each of the drive rollers 5-a and 5-b is calculated by equation $2x-2t$, and the vertical distance from the support roller 5-c to the drive roller 5-a or 5-b is 1.5×.

Figure 10:
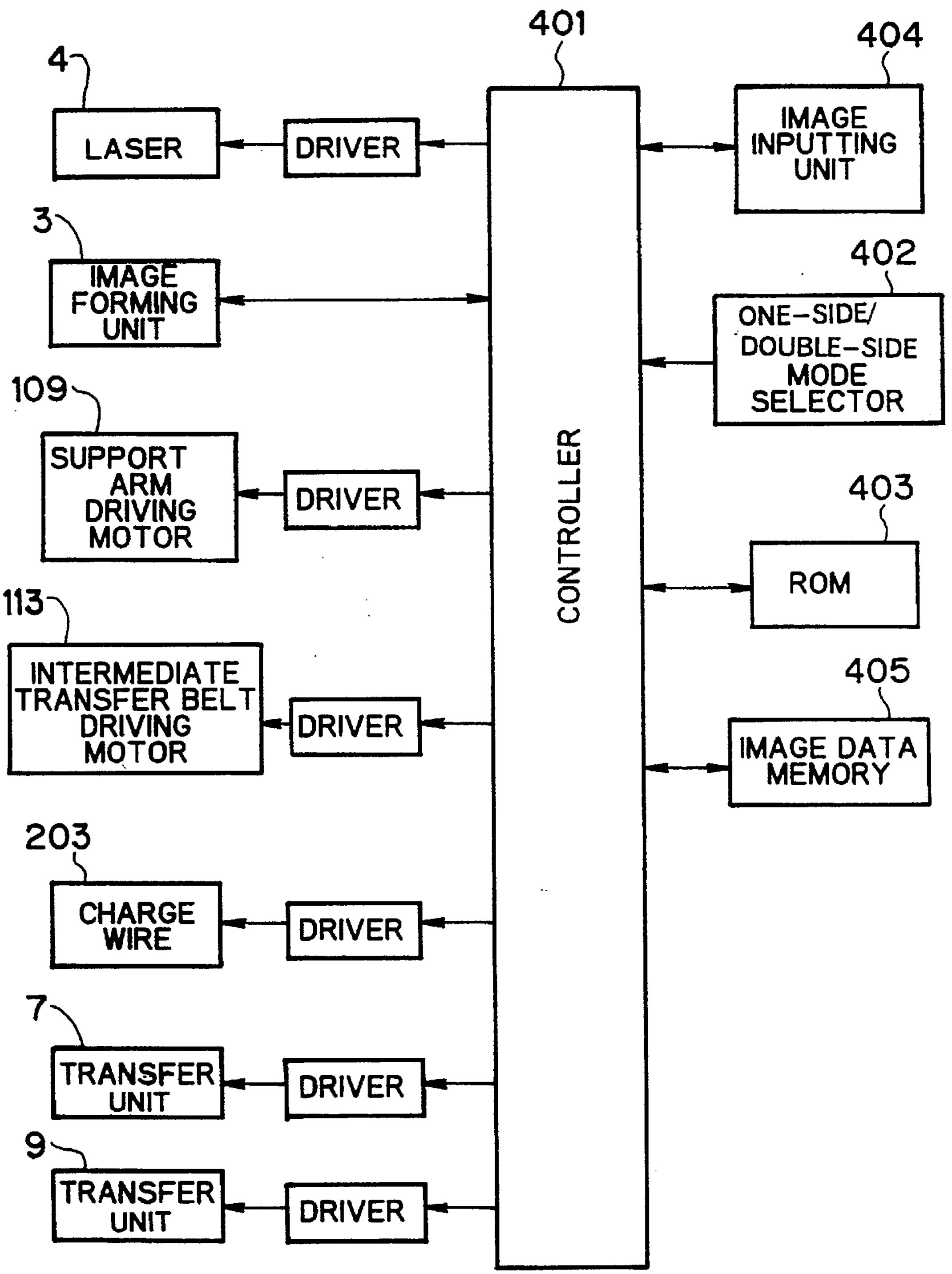
FIG. 10 is a block diagram of the control system in this embodiment.

FIG. 10 shows the control system of this embodiment. The overall operation of the printer is controlled by a controller 401. If a user selects either one-side mode or double-side mode by a mode selecter 402, the controller 401 will read the operation routine of the selected mode from a ROM (read-only memory) and operate the printer according to the operation routine. Note that the one-side/double-side mode selection may be made at the side of the host computer and the selected signal may be transmitted to the controller 401.

The image data inputted from the host computer through an image input unit 404 is temporarily stored in a memory 405. When formation of an image is interrupted for some obstacle during conveyance of the recoding paper, the interrupted image formation process can be resumed immediately after the restoration of the obstacle, because the image data has been stored in the memory 405. It is preferable that the memory 405 have a memory capacity equivalent to image data of both sides of the maximum recording paper that the printer handles. A laser 4 is driven according to the image data stored in the memory 405 and forms a latent image on the photosensitive drum 3*a* of the image forming unit 3. In the case of the one-side mode, the process is identical with a conventional process, but in the case of the double-side mode, the motor 109 for driving the support arm 104, the motor 113 for rotating the intermediate transfer belt 5, the conveying-path changing plate 11, the charge wire 203 in the drive roller 5-a, the transfer units 7 and 9, and other necessary members are controlled by the control unit 401, as will next be described in detail.

Double-Side Image Formation Process

Figure 11:
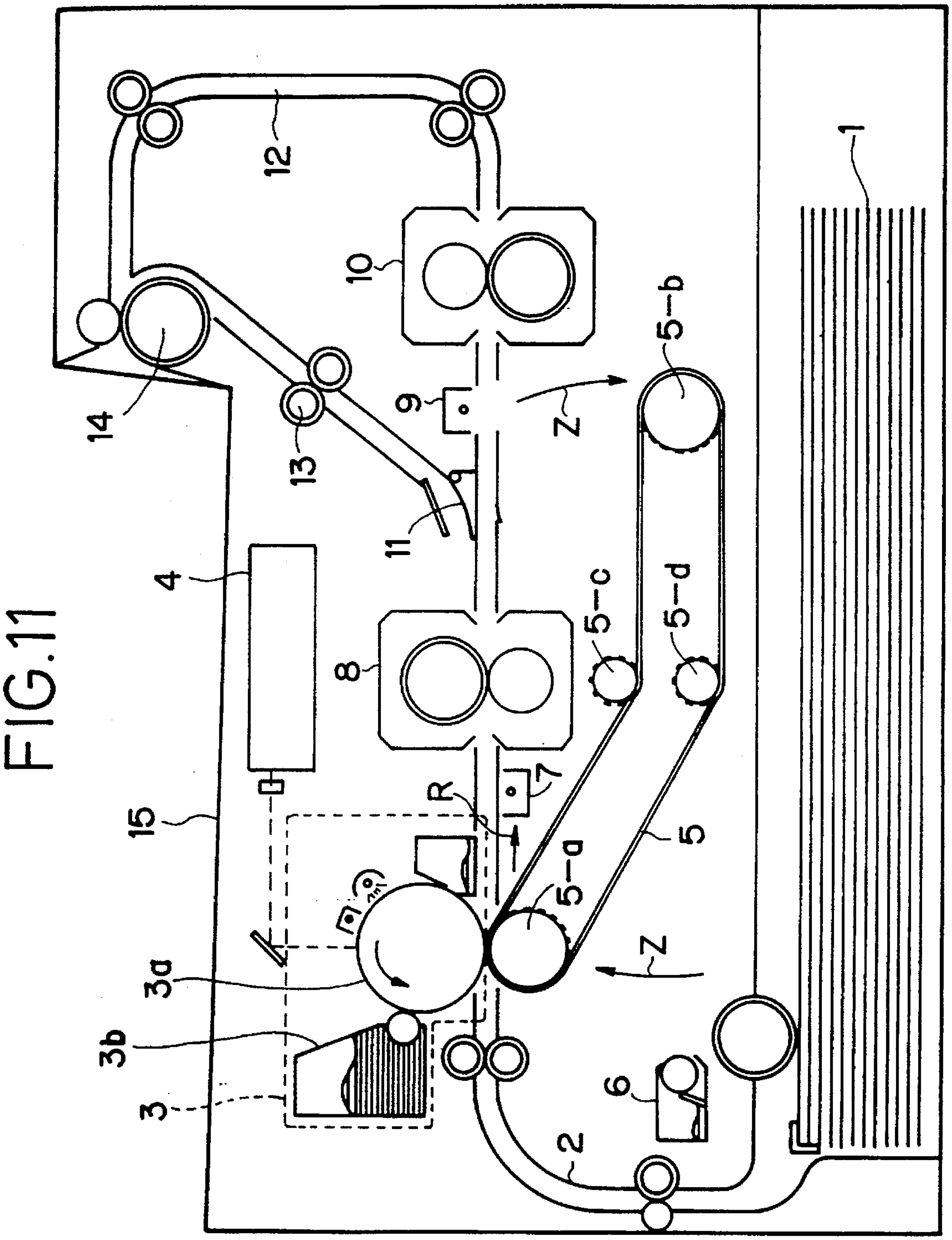
FIG. 11 is a sectional view of a printer showing the intermediate transfer operation in the double-side image formation mode of this embodiment.
Figure 12:
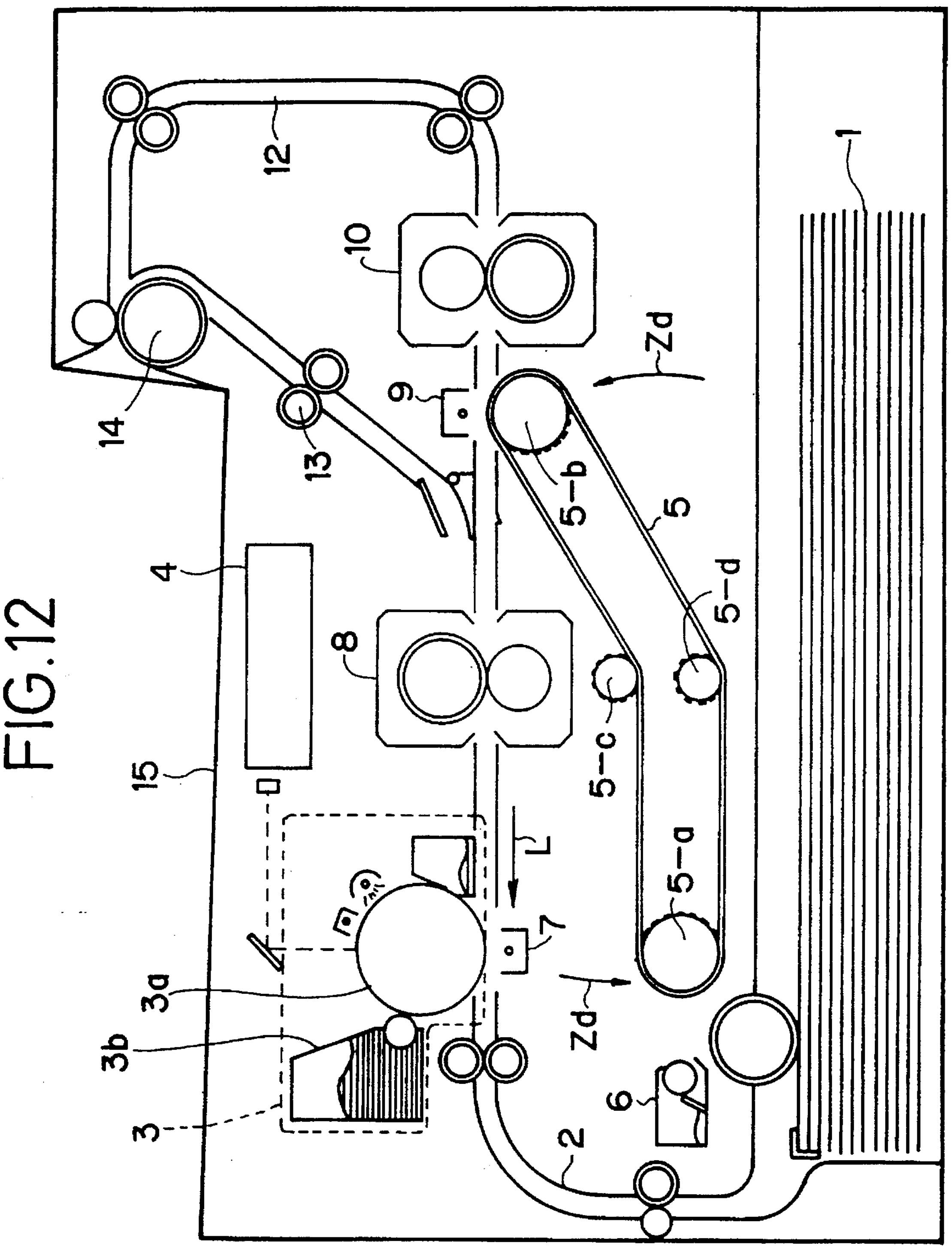
FIG. 12 is a view similar to FIG. 11 but showing the double-side transfer operation in the double-side image formation mode of this embodiment.
Figure 13:
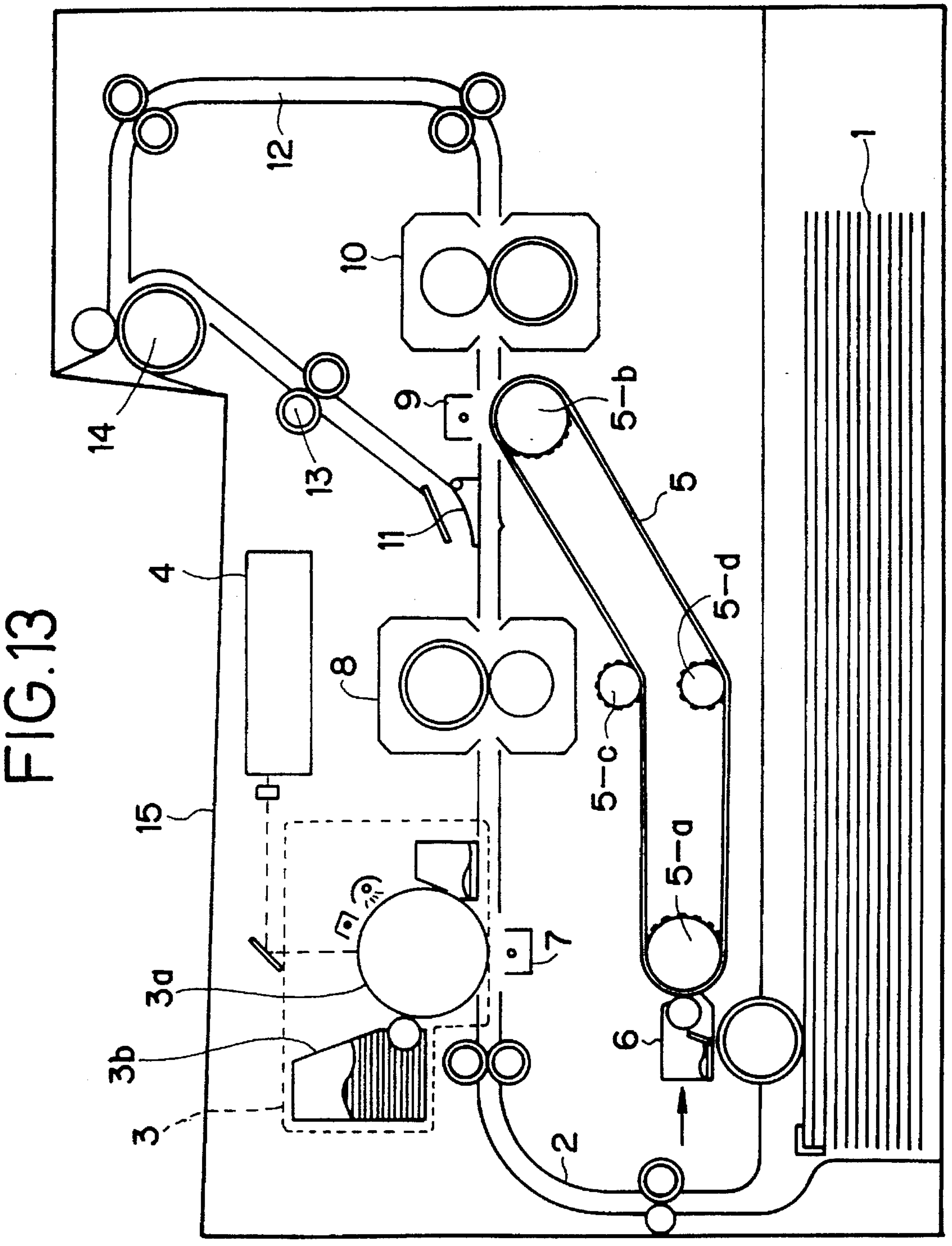
FIG. 13 is a view similar to FIG. 11 but showing the intermediate-transfer belt cleaning operation in the double-side image formation mode of this embodiment.

FIGS. 11 to 13 are sectional views of a printer for explaining an example of the double-side image formation process in this embodiment, respectively.

It is now assumed that in an initial state the drive roller 5-a of the intermediate transfer belt 5 is moved downward and the first transfer unit 7 is disposed just under the photosensitive drum 3*a*. This state is the state of the one-side mode.

If the double-side mode is selected by the host computer and the image data of both sides of the recording paper are stored in the memory 405, the control unit 401 will control the motor 109 such that the drive roller 5-a of the intermediate transfer belt 5 is raised in the direction indicated by arrow Z in FIG. 11 and disposed just under the photosensitive drum 3*a*. Simultaneously with this, the first transfer unit 7 is moved in the horizontal direction indicated by arrow R so that the drive roller 5-a can be disposed just under the photosensitive drum 3*a*.

Then, if the laser 4 is driven according to the image data and the photosensitive drum 3*a* is rotated, a latent image will be formed on the photosensitive drum 3*a* and developed by the development portion 3*b*. While the intermediate transfer belt 5 is being rotated at the same speed as the photosensitive drum 3*a* by the motor 113, the developer image on the photosensitive drum 3*a* is transferred to the intermediate transfer belt 5 by the corona discharge of the charge wire 203 in the drive roller 5-a. The transfer starting timing to the intermediate transfer belt 5 is synchronized with the timing that the control unit 401 controls the rotations of the photosensitive drum 3*a* and the motor 113. As described above, if a stepping motor is used as the motor 113, the rotation of the motor 113 can be easily controlled by pulses which are supplied.

If the image of one side of the recording paper is transferred to the intermediate transfer belt 5, the control unit 401 will control the motor 109 to move the intermediate transfer belt 5 in the direction indicated by arrow Zd and stop the operation of the image forming unit 3 and the laser 4 once, as shown in FIG. 12. Simultaneously with this, the first transfer unit 7 is moved in the direction indicated by arrow L and disposed just under the photosensitive drum 3*a*, and the drive roller 5-b of the intermediate transfer belt 5 is disposed just under the second transfer unit 9.

The remaining image data are then read out from the memory 405, and an image formation process is started by the image forming unit 3 and the laser 4. Simultaneously, a recording paper is let out of the recording paper storage unit 1 and conveyed through the conveying path 2. The developer image formed on the photosensitive drum 3*a* is then transferred to one side of the recording paper at predetermined timing by the first transfer unit 7, and further, a fixing process is performed by the first fixing unit 8.

The recording paper having an image formed on one side thereof is conveyed to the side of the second transfer unit 9, because the conveying-path changing plate 11 has been raised. In synchronization with the conveyance of the recording paper, the motor 113 is driven and the intermediate transfer belt 5 starts rotating. The timing that the recording paper reaches the second transfer unit 9 is synchronized with the timing that the leading end of the transferred developer image held on the intermediate transfer belt 5 is moved just under the second transfer unit 9, and the second transfer unit 9 is driven. For this reason, when the recording paper passes through the second transfer unit 9, the transferred developer image on the intermediate transfer belt 5 is transferred to the other side of the recording paper, and the image transferred to the recording paper is fixed by the second fixing unit 10. The recording paper in which images have been formed on both sides thereof in this way is discharged through the conveying path 12 into the tray 15 by the discharge roller 14.

If the leading end of the transferred developer image on the intermediate transfer belt 5 is then rotated to the drive roller 5-a, the cleaning unit 6 contacts with the intermediate transfer belt 5 and removes from the entire outer surface of the intermediate transfer belt 5 the developer that remained for some cause. If the cleaning of the intermediate transfer belt 5 is completed, the cleaning roller 6 will be moved away from the drive roller 5-a and held in position.

In this way, images are formed on both sides of the recording paper, respectively. If the double-side image formation is completed and the one-side mode is selected, the conveying path 11 will be lowered again, as shown in FIG. 1. In the one-side mode, an image is formed on one side of a recording paper in the state shown in FIG. 1 by the image forming unit 3 and the first transfer unit 7. After the fixing process by the first fixing unit 8, the recording paper is discharged through the conveying-path changing plate 11 and the conveyor roller 13 into the tray 15 by the discharge roller 14. In this case, the motors 109 and 113, the charge wire 203, the second transfer unit 9, and the second fixing unit 10, which relate to the intermediate transfer belt 5, are not operated.

While the subject invention has been described with relation to the electrophotographic printer, it is not limited to this but it will be understood that the invention can be applied to a copying machine, a laser printer, and other image forming apparatuses which use the electrophotographic process.

As has been described hereinbefore, the image forming method and apparatus according to the present invention are capable of double-side image formation without reversing the obverse and reverse of a recording paper. Therefore, a space for a switchback, which is inevitably required of the prior art, becomes unnecessary, and miniaturization of an apparatus can be easily accomplished.

In addition, according to the present invention, the recording paper is conveyed only in one direction, as is normal one-side image formation. Therefore, high-speed double-side image recording becomes possible with a simpler conveying path, and troubles associated with the recording paper can be reduced.

While the subject invention has been described with relation to the preferred embodiment, various modifications and adaptations thereof will now be apparent to those skilled in the art. All such modifications and adaptations as fall within the scope of the appended claims are intended to be covered thereby.

What is claimed is:

1. A method for forming a first image and a second image on both sides of a recording paper, respectively, by using an electrophotographic process, said method comprising the steps of:

generating said first image on a first image holding body capable of generating and transferring a developer image;

transferring said first image from said first image holding body to a second image holding body;

generating said second image on said first image holding body;

conveying said recording paper in one direction, said first image holding body and said second image holding body being disposed across a plane where said recording paper is conveyed;

transferring said second image from said first image holding body to one side of said recording paper;

fixing said second image on the side of said recording paper;

transferring said first image from said second image holding body to the other side of said recording paper; and fixing said first image on the other side of said recording paper.

2. The method as set forth in claim 1, wherein said second image holding body comprises a rotatable belt wound around at least two rollers including two drive rollers.

3. The method as set forth in claim 2, wherein one of said two drive rollers approachs said first image holding body only when said first image is transferred from said first image holding body to said second image holding body, and the other drive roller approachs said other side of said recording paper at least when said first image is transferred to said other side of said recording paper.

4. An apparatus which is capable of respectively forming images on both sides of a recording paper by using an electrophotographic process, said apparatus comprising:

conveyor means for conveying said recording paper in one direction;

first image holding means provided in one side of a conveying plane of said conveyor means and capable of generating and transferring a developer image;

second image holding means provided in the other side of said conveying plane and capable of transferring and holding said developer image generated in said first image holding means;

first transfer means for transferring said developer image from said first image holding means to one side of said recording paper, said first transfer means being provided in the other side of said conveying plane;

first driving means for moving said second image holding means and said first transfer means such that said second image holding means is moved to a position opposed to said first image holding means only when said developer image is transferred from said first image holding means to said second image holding means and said first transfer means is moved to the position opposed to said first image holding means when said developer image is transferred from said first image holding means to said one side of said recording paper;

first fixing means for fixing said developer image formed on one side of said recording paper, said first fixing means being provided downstream of said recording paper conveying direction than said first transfer means;

second transfer means for transferring said developer image held in said second image holding means to the other side of said recording paper, said second transfer means being provided downstream of said recording paper conveying direction than said first fixing means; and second fixing means for fixing said developer image transferred to the other side of said recording paper, said second fixing means being provided downstream of said recording paper conveying direction than said second transfer means.

5. The apparatus as set forth in claim 4, wherein said second image holding means comprises a rotatable belt wound around at least two rollers including two drive rollers.

6. The apparatus as set forth in claim 5, wherein said rotatable belt is rotated by said two drive rollers, and one drive roller of said two drive rollers comprises an intermediate transfer means for transferring said developer image from said first image holding means to said second image holding means.

7. The apparatus as set forth in claim 6, wherein said intermediate transfer means comprises an inducing means for inducing static electricity on said second image holding means, said inducing means being provided in a groove in said one drive roller.

8. The apparatus as set forth in claim 5, further comprising:

support means for supporting said at least two rollers; and second driving means for moving said support means such that one of said two drive rollers approachs said first image holding body only when said first image is transferred from said first image holding body means to said second image holding body means, and the other drive roller approachs said other side of said recording paper at least when said first image is transferred to said other side of said recording paper.

9. The apparatus as set forth in claim 8, wherein said first driving means and said second driving means are synchronized.

10. The apparatus as set forth in claim 8, wherein said belt is rotated by said two drive rollers, and one drive roller of said two drive rollers comprises an intermediate transfer means for transferring said developer image from said first image holding means to said second image holding means.

11. The apparatus as set forth in claim 10, wherein said intermediate transfer means comprises an inducing means for inducing static electricity on said second image holding means, said inducing means being provided in a groove in said one drive roller.

* * * * *